United States Patent
Takeda et al.

(10) Patent No.: US 10,560,928 B2
(45) Date of Patent: Feb. 11, 2020

(54) USER TERMINAL, RADIO BASE STATION AND RADIO COMMUNICATION METHOD

(71) Applicant: NTT DOCOMO, INC., Tokyo (JP)

(72) Inventors: Kazuaki Takeda, Tokyo (JP); Satoshi Nagata, Tokyo (JP); Hideaki Takahashi, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/772,620

(22) PCT Filed: Nov. 1, 2016

(86) PCT No.: PCT/JP2016/082471
§ 371 (c)(1),
(2) Date: May 1, 2018

(87) PCT Pub. No.: WO2017/078023
PCT Pub. Date: May 11, 2017

(65) Prior Publication Data
US 2019/0124625 A1  Apr. 25, 2019

(30) Foreign Application Priority Data

Nov. 2, 2015  (JP) .................................. 2015-216044
Nov. 4, 2015  (JP) .................................. 2015-217102

(51) Int. Cl.
*H04W 72/04*  (2009.01)
*H04W 4/70*   (2018.01)
(Continued)

(52) U.S. Cl.
CPC ........... *H04W 72/042* (2013.01); *H04W 4/70* (2018.02); *H04W 48/10* (2013.01); *H04W 48/16* (2013.01);
(Continued)

(58) Field of Classification Search
CPC .............................. H04W 72/042; H04W 4/70
See application file for complete search history.

(56) References Cited

U.S. PATENT DOCUMENTS 8,843,115 B2     9/2014  Amerga et al.
2015/0304996 A1* 10/2015  Yang ..................... H04L 5/0053
                                                     370/329
(Continued)

FOREIGN PATENT DOCUMENTS

JP  2011-525783 A   9/2011
WO  2015/026392 A1  2/2015

OTHER PUBLICATIONS

Extended European Search Report issued in the counterpart European Patent Application No. 16862083.9, dated Jul. 16, 2018 (11 pages).

(Continued)

*Primary Examiner* — Ernest G Tacsik
(74) *Attorney, Agent, or Firm* — Osha Liang LLP

(57) ABSTRACT

The present invention is designed so that adequate communication is allowed even when system information is changed. The present invention provides a receiving section that receives a DL signal, which includes information that orders a modification of system information, and a control section that controls the modification of the system information based on the DL signal, and, when information related to content of the modification of the system information is included in the information ordering the modification, the control section changes a part or all of the system information based on the information related to the content of the modification. Also, in the modification order information, information to indicate that the system information is not changed and information to indicate the content of the modification when the system information is changed are (Continued)

| Bit fields for system information change | SI message |
|---|---|
| 00 | No update |
| 01 | Start from SIB1 reception |
| 10 | SI-X |
| 11 | SI-Y | defined as different pieces of bit information in the same bit field.

9 Claims, 14 Drawing Sheets

(51) Int. Cl.
*H04W 48/10* (2009.01)
*H04W 48/16* (2009.01)
*H04W 48/12* (2009.01)
*H04W 4/90* (2018.01)
*H04W 48/06* (2009.01)

(52) U.S. Cl.
CPC .............. *H04W 4/90* (2018.02); *H04W 48/06* (2013.01); *H04W 48/12* (2013.01); *Y02D 70/00* (2018.01)

(56) References Cited

U.S. PATENT DOCUMENTS

2016/0212686 A1 7/2016 Viorel et al.
2017/0105166 A1* 4/2017 Lee ...................... H04W 48/12

OTHER PUBLICATIONS

InterDigital; "System Information Update for MTC UE"; 3GPP TSG-RAN WG2 #91 bis R2-154818; Malmo, Sweden, Oct. 5-9, 2015 (2 pages).
InterDigital, et al.; "WF on Paging for eMTC and UE in CE"; 3GPP TSG RAN WG1 Meeting #82bis R1-156286; Malmo, Sweden, Oct. 5-9, 2015 (3 pages).
International Search Report issued in PCT/JP2016/082471 dated Jan. 24, 2017 (3 pages).
Written Opinion of the International Searching Authority issued in PCT/JP2016/082471 dated Jan. 24, 2017 (4 pages).
Ericsson; "System information update, valueTag and validity time"; 3GPP TSG-RAN WG2 #91bis, Tdoc R2-154787; Malmo, Sweden; Oct. 5-9, 2015 (6 pages).
Huawei, HiSilicon; "DCI content/format for MTC transmission"; 3GPP TSG RAN WG1 Meeting #82bis, R1-155110; Malmo, Sweden; Oct. 5-9, 2015 (6 pages).
Panasonic; "Handling of collisions between MTC channels and legacy SRS"; 3GPP TSG RAN WG1 Meeting #82bis, R1-155342; Malmo, Sweden; Oct. 5-9, 2015 (3 pages).
NTT DOCOMO, Inc.; "SI change indication mechanism"; 3GPP TSG-RAN2#92, R2-156422; Anaheim, USA; Nov. 16-20, 2015 (2 pages).
Intel Corporation; "Email discussion report on [91bis#16][LTE/MTC] System Information"; 3GPP TSG RAN WG2 Meeting #92, R2-156345; Anaheim, USA; Nov. 16-20, 2015 (23 pages).
InterDigital; "Remaining Issues on DCI contents"; 3GPP TSG RAN WG1 Meeting #83, R1-157429; Anaheim, USA; Nov. 15-22, 2015 (3 pages).
LG Electonics; "Details on DCI design for MTC"; 3GPP TSG RAN WG1 Meeting #83, R1-156844; Anaheim, USA; Nov. 15-22, 2015 (4 pages).
Ericsson; "DCI definition for MTC"; 3GPP TSG RAN WG1 Meeting #83, R1-156417; Anaheim, USA; Nov. 15-22, 2015 (3 pages).
LG Electronics; "WF on FFS points Regarding DCI contents"; 3GPP TSG RAN WG1 #83, R1-157895; Anaheim, USA; Nov. 15-22, 2015 (5 pages).
3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
3GPP TR 36.888 V12.0.0; "3rd Generation Partnership Project; Technical Specification Group Radio Access Network; Study on provision of low-cost Machine-Type Communications (MTC) User Equipments (UEs) based on LTE (Release 12)"; Jun. 2013 (55 pages).
Office Action issued in the counterpart European Patent Application No. 16862083.9, dated Mar. 18, 2019 (17 pages).
Intel Corporation; "Remaining details on paging enhancements for MTC"; 3GPP TSG RAN WG1 Meeting #82bis R1-155304; Malmö, Sweden, Oct. 5-9, 2015 (7 pages).
MediaTek Inc.; "Paging design for Rel-13 LC/CE UEs"; 3GPP TSG RAN WG1 Meeting #82bis R1-155950; Malmö, Sweden, Oct. 5-9, 2015 (5 pages).
Office Action issued in the counterpart European Application No. 16 862 083.9, dated Sep. 2, 2019 (11 pages).

* cited by examiner

| Bit fields for system information change | SI message |
|---|---|
| 00 | No update |
| 01 | Start from SIB1 reception |
| 10 | SI-X |
| 11 | SI-Y |

FIG. 4A

| Bit fields for system information change | SI message |
|---|---|
| 00 | No update |
| 01 | Start from SIB1 reception |
| 10 | SI-X |
| 11 | SI-X and SI-Y |

FIG. 4B

| Bit fields for system information change | SI message |
|---|---|
| 00 | No update |
| 01 | Start from SIB1 reception |
| 10 | SIB-X |
| 11 | SIB-Y |

FIG. 5A

| Bit fields for system information change | SI message |
|---|---|
| 00 | No update |
| 01 | Start from SIB1 reception |
| 10 | SIB-X |
| 11 | SBI-X and SIB-Y |

FIG. 5B

| Bit fields for system information change | SI message |
|---|---|
| 00 | No update |
| 01 | Start from SIB1 reception |
| 10 | Configured by previous MTC-SIB1 |
| 11 | Configured by previous MTC-SIB1 |

FIG. 6

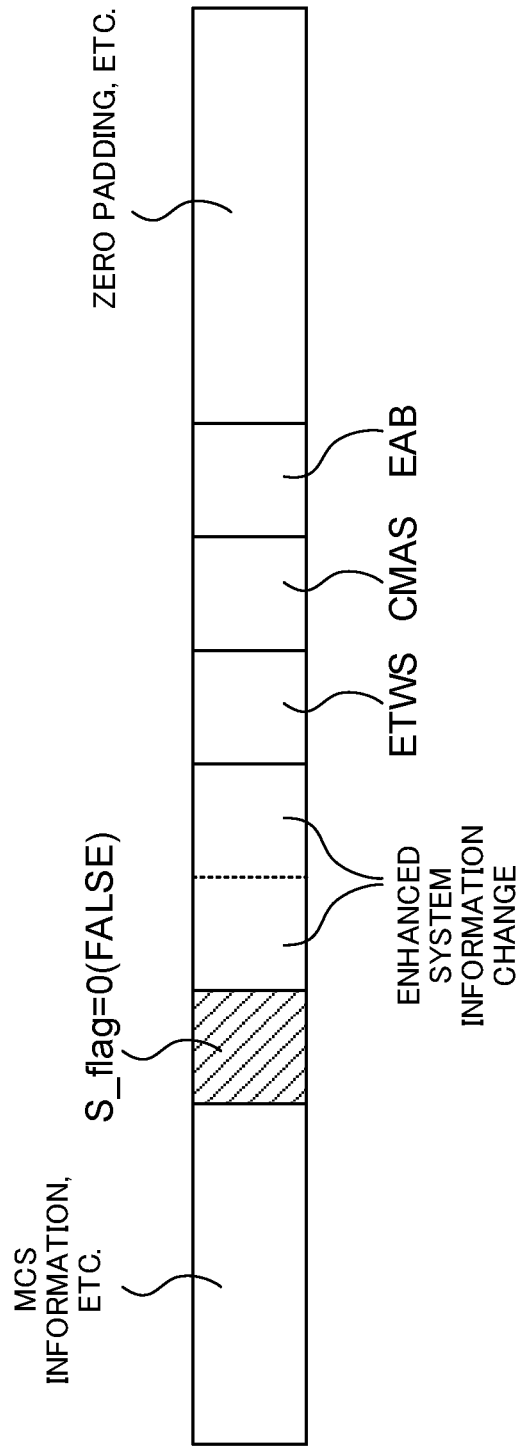

USER TERMINAL, RADIO BASE STATION AND RADIO COMMUNICATION METHOD

TECHNICAL FIELD

The present invention relates to a user terminal, a radio base station and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1). Also, the specifications of LTE-A (also referred to as LTE-advanced, LTE Rel. 10, 11 or 12) have been drafted for further broadbandization and increased speed beyond LTE (also referred to as LTE Rel. 8 or 9), and successor systems of LTE (also referred to as, for example, FRA (Future Radio Access), 5G (5th generation mobile communication system), LTE Rel. 13 and so on) are under study.

Now, accompanying the cost reduction of communication devices in recent years, active development is in progress in the field of technology related to machine-to-machine communication (M2M) to implement automatic control of network-connected devices and allow these devices to communicate with each other without involving people. In particular, 3GPP (3rd Generation Partnership Project) is promoting the standardization of MTC (Machine-Type Communication) for cellular systems for machine-to-machine communication, among all M2M technologies (see non-patent literature 2).

In the course of standardization, various functions which terminals for use in MTC (MTC terminals) are also being studied, and, for example, a study is in progress to limit the transmitting/receiving bandwidth of terminals in order to reduce the cost. For another example, given that MTC terminals may be located in places where the MTC terminals suffer significant building penetration loss and have difficulty making radio communication, such as the depths of a building, the basement, and so on, MTC terminals that are directed to achieving enhanced coverage (coverage enhancement) are also under study.

Based on the above two examples, MTC terminals (MTC UEs (User Equipment)) can be divided into the following four types: (1) terminals without limits on the transmitting/receiving bandwidth and without coverage enhancement functions; (2) terminals with limits on the transmitting/receiving bandwidth and without coverage enhancement functions; (3) terminals without limits on the transmitting/receiving bandwidth and with coverage enhancement functions; and (4) terminals with limits on the transmitting/receiving bandwidth and with coverage enhancement functions. MTC terminals are being studied for use in a wide range of fields, such as, for example, electric meters, gas meters, vending machines, vehicles and other industrial equipment.

As a method of coverage enhancement, it may be possible to apply repetitious transmission (repetition), which improves the received-signal-to-interference-plus-noise ratio (SINR) by repeating transmitting the same signal over multiple subframes in the downlink (DL) and/or in the uplink (UL). For example, when a radio base station (eNB: eNode B) transmits a predetermined signal in repetitions, an MTC terminal applies power coupling to the signals received, and performs receiving processes (demodulation, decoding, etc.).

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"
Non-Patent Literature 2: 3GPP TS 36.888 "Study on provision of low-cost Machine-Type Communications (MTC) User Equipments (UEs) based on LTE (Release 12)"

SUMMARY OF INVENTION

Technical Problem

In LTE systems, user terminals control communication based on system information (SI) that is transmitted from the network (radio base stations). The system information is included and transmitted in the master information block (MIB), system information blocks (SIBs) and so on. The user terminals receive the system information that is broadcast by the network in repetitions.

Multiple types of SIBs (for example, SIB1 to SIB 19) are stipulated in LTE systems, and each SIB is mapped in a different system information message (SI window). Each SI window is transmitted in a different transmission cycle, and one or a plurality of SIBs are mapped to the same SI window and transmitted to user terminals. To acquire the system information stipulated in the SIBs, the user terminals receive the SIBs from SIB1.

When system information is to be changed in existing communication systems, a radio base station sends a notification of a modification of system information to a user terminal, by using paging information (paging message) that orders a modification of system information. The user terminal, upon receiving the paging information containing the system information modification notification (for example, systemInfoModification), performs the system information changing operation. If the user terminal acquires system information that is provided in SIBs, the user terminal has to acquire all the system information from SIB1 again, and change (update) the system information.

However, if only a part of the system information is to be changed, acquiring all the system information from SIB1 and performing the system information changing operation is a time-consuming way of changing system information. For example, when a notification of a modification of system information is sent to an MTC terminal that uses repetitious transmission in order to achieve coverage enhancement, there is a fear that that the system information changing operation takes time and the MTC terminal becomes unable to communicate adequately.

The present invention has been made in view of the above, and it is therefore an object of the present invention to provide a user terminal, a radio base station and a radio communication method that allow adequate communication even when system information is changed.

Solution to Problem

According to one aspect of the present invention, a user terminal has a receiving section that receives a DL signal, which includes information that orders a modification of system information, and a control section that controls the modification of the system information based on the DL signal, and, when information related to content of the modification of the system information is included in the information ordering the modification, the control section changes a part or all of the system information based on the information related to the content of the modification.

Advantageous Effects of Invention

According to the present invention, adequate communication is allowed even when system information is changed.

BRIEF DESCRIPTION OF DRAWINGS

FIG. 4A and FIG. 4B provide diagrams to show examples of information that orders a modification of system information, according to a first example;

FIG. 5A and FIG. 5B provide diagrams to show other examples of information that orders a modification of system information, according to the first example;

FIG. 6 is a diagram to show another example of information that orders a modification of system information, according to the first example;

FIG. 7A and FIG. 7B provide diagrams to show examples of the method of transmitting information that orders a modification of system information, according to a second example;

DESCRIPTION OF EMBODIMENTS

Figure 1:
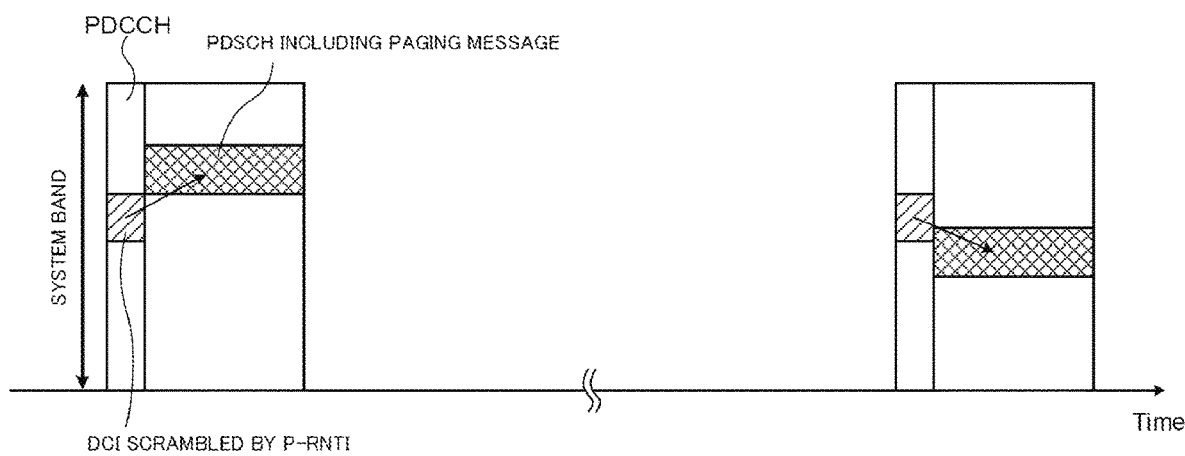
FIG. 1 is a diagram to show an example of the method of transmitting/receiving paging information in existing systems.

FIG. 1 shows an example of transmission/receipt of paging information in existing LTE systems (Rel. 12 and earlier versions). Existing LTE systems provide support for sending system information modification notifications, which use paging information (paging messages), to user terminals in RRC-connected mode and user terminals in RRC idle mode.

User terminals in RRC idle mode detect the downlink control information (DCI) transmitted in the common search space (common SS) in a downlink control channel (PDCCH) at a predetermined paging timing. Then, based on the scheduling information (DL assignment) contained in this DCI, the user terminals acquire the paging information transmitted in a downlink shared channel (PDSCH). Note that, for the DCI, DCI (DCI format 1A or DCI format 1C) that is scrambled by using a paging identifier (P-RNTI) is used.

The paging timing is configured based on a paging occasion (PO), which indicates the subframe in which the P-RNTI-scrambled DCI is transmitted, and the radio frame in which the PO is included (PF: Paging Frame). The user terminals monitor for the paging information based on the PO and the PF. User terminals in idle mode can save the power consumption by performing the receiving operation only during the period they need to monitor for the paging information, and by assuming sleep mode or power-save mode during the other periods.

The paging information that is transmitted from the radio base station can include notifications of each user terminal's paging record, information to order a modification of system information (for example, SystemInfoModification), ETWS (Earthquake and Tsunami Warning System), CMAS (Commercial Mobile Alert Service), EAB (Extended Access Barring), and so on.

When system information is to be changed in the network, the radio base station can order a modification (update) of system information to a user terminal by using paging information. When receiving the paging information to report a modification of system information (for example, SystemInfoModification), the user terminal performs the system information changing operation. For example, the user terminal, having been ordered a modification of system information, acquires system information such as a plurality of SIBs that contain system information (system information acquisition).

Now, accompanying the cost reduction of communication devices in recent years, MTC (Machine Type Communication) and suchlike technologies are gaining popularity. Studies are in progress to simplify the hardware structures of MTC terminals for use in MTC (also referred to as "eMTC," "category M," "category X," "NB-IoT," etc.) at the risk of lowering their processing capabilities. For example, studies are in progress to lower the peak rate, limit the transport block size, limit the resource blocks (also referred to as "RBs," "PRBs" (Physical Resource Blocks) and so on), and limit the RFs to receive, and so on, in low-cost MTC terminals (LC (Low Cost)-MTC UEs) with limited transmitting/receiving bandwidth, in comparison to existing user terminals (LTE terminals).

Low-cost MTC terminals can be implemented by limiting the bands to use in the uplink (UL) band and the downlink (DL) to a narrow band (NBs), which is a portion of the system band. The system band may be, for example, an existing LTE band (for example, 20 MHz), a component carrier (CC) and so on. Note that low-cost MTC terminals may be referred to simply as "MTC terminals," and will be referred to as "MTC terminals" hereinafter. Also, existing user terminals may be referred to as "normal UEs," "non-MTC UEs," and so on.

Unlike existing user terminals, in which the system band (for example, 20 MHz (100 PRBs), one component carrier, etc.) is configured as the upper limit band for use, the upper limit band for use for MTC terminals may be limited to a predetermined narrow band (for example, 1.4 MHz (6 PRBs), 200 kHz (1 PRB), etc.). Studies are in progress to run such band-limited MTC terminals in LTE/LTE-A system bands, considering the relationship with existing user terminals.

For example, LTE/LTE-A system bands provide support for frequency-multiplexing band-limited MTC terminals and band-unlimited existing user terminals. Consequently, MTC terminals may be seen as terminals in which the maximum band to be supported is a partial narrow band in a system band, or may be seen as terminals that have the functions for transmitting/receiving in a narrower band than LTE/LTE-A system bands.

Figure 2:
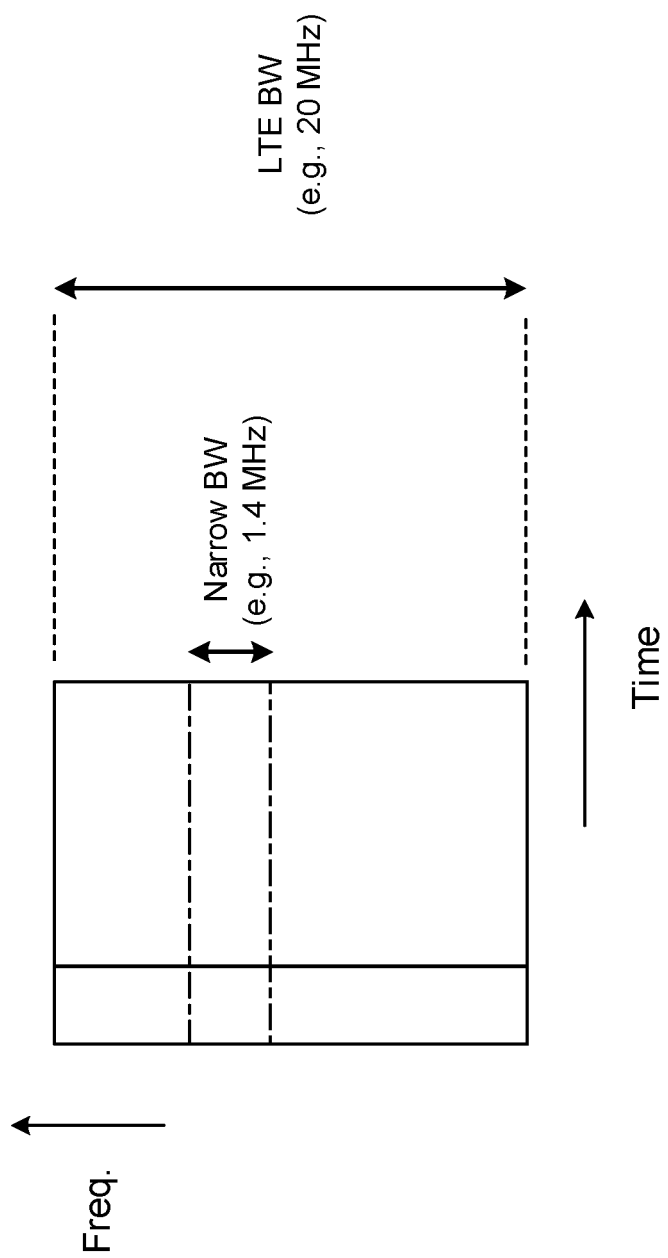
FIG. 2 is a diagram to show an example of the arrangement of a narrow band in a system band.

FIG. 2 is a diagram to show an example of the arrangement of a narrow band in a system band. In FIG. 2, a predetermined band (for example, 1.4 MHz), which is narrower than an LTE system band (for example, 20 MHz), is configured in a portion of a system band. This band is a frequency band that can be detected by MTC terminals.

Note that it is preferable to employ a structure in which the narrow band that serves as the band for use by MTC terminals can change its frequency location within the system band. For example, MTC terminals should preferably be able to communicate by using different frequency resources per predetermined period (for example, per subframe). This makes it possible to achieve traffic offloading for MTC terminals, achieve a frequency diversity effect, and reduce the decrease of spectral efficiency. Consequently, considering the application of frequency hopping, frequency scheduling and so on, MTC terminals should preferably have an RF re-tuning function.

Note that different frequency bands may be used between the narrow band to use in downlink transmission/reception (DL NB: Downlink Narrow Band) and the narrow band to use in uplink transmission/reception (UL NB: Uplink Narrow Band). Also, the DL NB may be referred to as the "downlink narrow band," and the UL NB may be referred to as the "uplink narrow band."

MTC terminals receive downlink control information (DCI) by using a downlink control channel that is placed in a narrow band, and this downlink control channel may be referred to as an "EPDCCH" (Enhanced Physical Downlink Control CHannel), or may be referred to as an "MPDCCH" (MTC PDCCH) or an "NB-PDCCH."

Also, MTC terminals receive downlink data by using a downlink shared channel (downlink data channel) that is placed in a narrow band, and this downlink shared channel may be referred to as a "PDSCH" (Physical Downlink Shared CHannel), or may be referred to as an "MPDSCH" (MTC PDSCH) or an "NB-PDSCH."

Also, an uplink control channel (for example, the PUCCH (Physical Uplink Control CHannel)) and an uplink shared channel (for example, the PUSCH (Physical Uplink Shared CHannel)) for MTC terminals may be referred to as an "MPUCCH" (MTC PUCCH), "MPUSCH" (MTC PUSCH), "NB-PUCCH," and an "NB-PUSCH," and so on. The above channels are by no means limiting, and any channel that is used by MTC terminals may be represented by affixing an "M," which stands for MTC, or an "NB," which stands for NB, to the existing channel used for the same purpose.

Furthermore, in conventional LTE, control information for an unspecified number of terminals (for example, system information blocks (SIBs)) is stored in the PDSCH, and in which radio resources the control information for a specific terminal is stored is specified by using the PDCCH. By contrast with this, a study is in progress to allocate control information for MTC terminals to radio resources on a fixed basis, without using the PDCCH or the EPDCCH.

When control information is received under such conditions, MTC terminals need to know information that specifies the locations of subframes in which the control information is transmitted, the location in the frequency direction, the transport block size (TBS) and the modulation scheme (MCS), in advance. Note that it is also possible to provide SIBs for MTC terminals, and these SIBs may be referred to as "MTC-SIBs."

Now, a study is in progress to apply coverage enhancement to wireless communication by MTC terminals. For example, for MTC terminals, coverage enhancement of maximum 15 dB is under study, in comparison to existing user terminals.

As for the method of coverage enhancement in wireless communication by MTC terminals, for example, the method of repeating transmitting the same signal (for example, transport block) in the downlink (DL) and/or the uplink (UL) (repetition), and/or the method of repeating transmitting signals of different RVs (Redundancy Versions) in the same codeword may be employed. The number of times to repeat transmission (the number of repetitions) required to achieve desired coverage performance (for example, coverage of maximum 15 dB) may increase depending on the environment in which communication takes place.

Signals that are transmitted in repetitions are combined on the receiving end, and used in receiving processes (for example, demapping, demodulation, decoding, etc.). By this means, the received signal quality can be improved. Note that receiving signals that are transmitted in repetitions may be referred to as "repetitious reception," "combining reception," etc.

The radio base station can report information regarding the number of repetitions for uplink signals (for example, the PUSCH) and/or downlink signals (for example, the PDSCH) to MTC terminals by using one of broadcast information (the MIB (Master Information Block) and SIBs), higher layer signaling (for example, RRC (Radio Resource Control) signaling) and downlink control information (DCI), or by combining these. Alternatively, MTC terminals can make decisions based on the RSRP and other received quality measurement results.

Assuming the case where MTC terminals such as those described above are introduced, there is an ongoing study to report information that orders a modification of system information and such other information to MTC terminals by using paging information. Also, from the perspective of achieving reduced power consumption, a study is also made to control MTC terminals not to receive paging information in RRC-connected mode, and perform the paging information receiving operation only in RRC idle mode. If there is a modification of system information in this case, MTC terminals in RRC-connected mode shift to RRC idle mode on a tentative basis and acquire the paging information.

Figure 3:
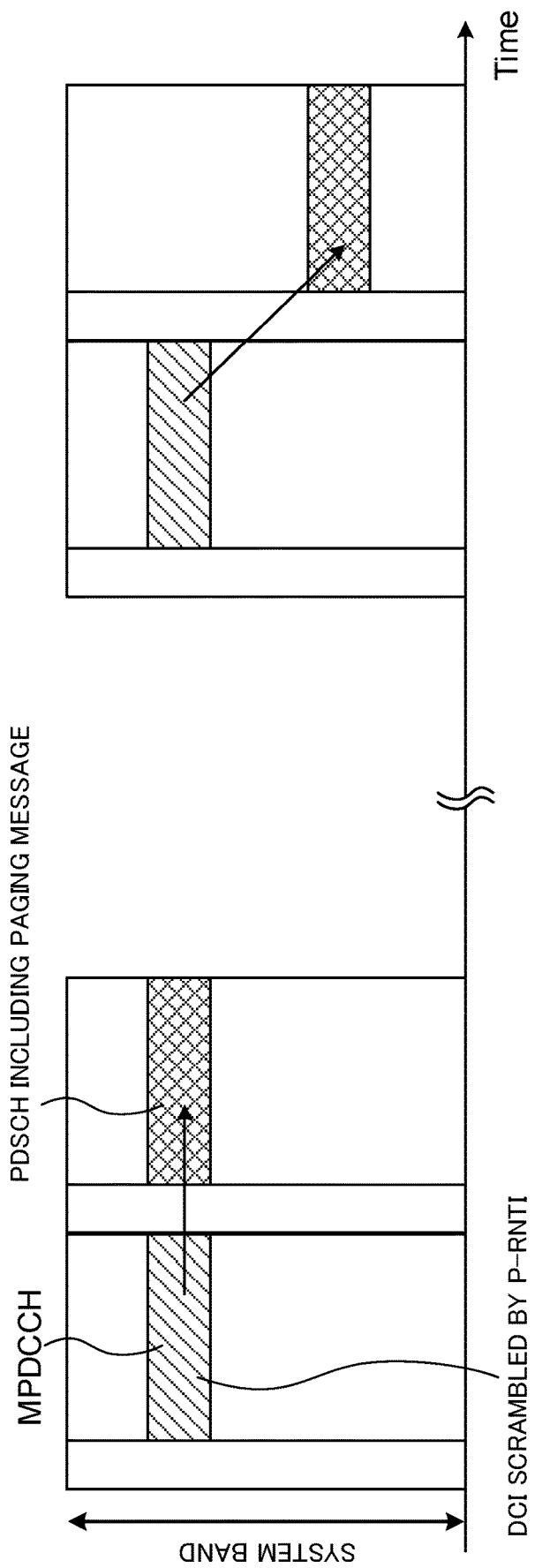
FIG. 3 is a diagram to show an example of the method of transmitting/receiving paging information in MTC.

Also, since MTC terminals cannot receive the existing PDCCH, the radio base station may transmit downlink control information (P-RNTI-scrambled DCI) that specifies the allocation of the PDSCH, in which the paging information is included, by using the MPDCCH (for example, in the common search space) (see FIG. 3). In this case, the PDSCH to contain the paging message and the MPDCCH to specify the allocation of the PDSCH are transmitted in different transmission time intervals (for example, subframes).

Note that FIG. 3 shows the case in which the MPDCCH and the PDSCH are allocated to the same narrow band (NB)

(left figure), and the case where the MPDCCH and the PDSCH are allocated to different narrow bands (right figure). When the MPDCCH and the PDSCH which the MPDCCH specifies are arranged in different narrow bands, a retuning period may be configured. In this way, by using the MPDCCH, MTC terminals can receive the paging information that is transmitted in the PDCCH.

Also, when the system information is changed, the radio base station can include modification order information (also referred to as "SystemInfoModification," "SI update change," or "system information change"), which indicates whether or not there is a modification of system information, in the paging information, and report this to MTC terminals. In this case, the MTC terminals might receive the information that orders a modification of system information and update the system information by performing the system information changing operation (including, for example, the process of receiving from MTC-SIB1) as in existing systems.

However, in this case, even when only a part of the system information is changed, the MTC terminals need to acquire the rest of the information that is not changed (for example, a plurality of SIBs from MTC-SIB1). As a result of this, there is a threat that a modification (update) of system information becomes time-consuming in MTC terminals. In particular, when coverage enhancement is applied to MTC, repetitious transmission takes place in the DL and/or the UL, and therefore there is a threat that MTC terminals may not be able to communicate adequately if changing (updating) the system information takes time.

So, the present inventors have come up with a structure in which, when there is a modification of system information, MTC terminals can be controlled to change only a part of the system information (operate to receive only a part of the system information) depending on the content of the modification of system information.

According to one example of the present embodiment, when system information is to be changed in a communication system, not only a system information modification order (which indicates whether or not there is a modification), but also information related to the content of the system information to be changed (the content of the modification of system information) is reported to MTC terminals. The MTC terminals change only a part of the system information based on the information related to the content of the modification of system information, so that the time it takes to change the system information can be shortened.

Note that the information to order a modification of system information, including information related to the content of the modification of system information, may be referred to as "enhanced SystemInfoModification," "enhanced SI update change," or "enhanced system information change." Also, as for the information that relates to the content of modification of system information, predetermined system information that orders a modification to MTC terminals can be used depending on the content of modification of system information. Note that the information related to the content of modification of system information to be reported to MTC terminals has only to be information that at least includes the system information to be changed, and does not have to be the content of modification of system information itself.

Furthermore, the radio base station can include modification order information, including the content of modification of system information, in a predetermined DL signal and/or DL channel (hereinafter referred to as "DL signal"), and report this. As for the DL signal, the paging information and/or the downlink control information (DCI) that is transmitted in a downlink shared channel can be used.

For example, the radio base station configures and transmits information related to the content of modification of system information in a bit field in DCI (for example, P-RNTI-scrambled DCI) that is transmitted in a downlink control channel (for example, the MPDCCH) in a predetermined period (for example, PO). By reporting the system information to be changed by using downlink control information, it is possible to allow the MTC terminals to quickly acquire the information that orders a modification of system information.

Now, embodiments of the present invention will be described below. Although MTC terminals will be shown as exemplary user terminals that are limited to using a narrow band as the band for their use, the application of the present invention is not limited to MTC terminals. The present invention is applicable to any communication systems (user terminals and/or radio base stations) where system information is subject to change (updating). Furthermore, although a 6-PRB (1.4-MHz) narrow band will be described below, the present invention can be applied to other narrow bands as well, based on the present description.

First Example

In accordance with a first example, an example of information that orders a modification of system information (also referred to as "enhanced SystemInfoModification," "enhanced SI update change" or "enhanced system information change") and that is reported to MTC terminals will be described.

FIG. 4 shows examples of tables that provide the information (bit information) that orders a modification of system information, and that is to be reported to MTC terminals. In the tables of FIGS. 4A and 4B, information to indicate that system information is not changed, and information to specify the contents of modifications when modifications are made to system information are defined as different pieces of bit information in the same bit field.

In FIG. 4A, the bit information is "00" indicates that system information is not changed. Also, the bit information "01," "10" and "11" indicate that system information is changed, and varying contents of modifications of system information are defined for each piece of bit information. Here, the bit information "01" indicates that the system information changing operation starts from receiving SIB1, and the bit information "10" and "11" each indicate that the system information changing operation changes only a part of the system information (here, SI-X and SI-Y).

SI-X and SI-Y each represent a predetermined SI window, and each SI can be formed with one or a plurality of SIBs. Each SI can be configured in a certain transmission cycle (for example, 80 ms, 160 ms, 320 ms, 640 ms, etc.), so that SIBs that are mapped to the same SI can be transmitted in the same transmission cycle. Also, each SI's constituent SIBs can be configured as appropriate. In FIG. 4, X and Y can be configured in different values, and, for example, configured as X=1 and Y=2.

Also, it is possible to define a plurality of SIs in association with one piece of bit information. For example, in FIG. 4B, when the bit information is "11," this indicates commanding an MTC terminal to change a plurality of SIs (here, the combination of SI-X and SI-Y) in the system information changing operation. By this means, depending on the content of modification of system information, it is possible to flexibly report an order for a partial modification of system information to the MTC terminal. As a result of this, it is possible to lighten the system information changing operation in the MTC terminal (for example, shorten the time it takes to make a modification), and reduce the power consumption.

Note that, although cases have been shown with FIG. 4 where the information that orders a modification of system information is defined by using a bit field of 2 bits, the present embodiment is by no means limited to this. It is equally possible to define a plurality of contents of modifications by using a bit field of 3 or more bits.

Furthermore, although cases have been shown with FIG. 4 where, as information to order a modification of system information, bit information to indicate that system information is not changed (for example, "00") and bit information to show the contents of modifications of system information are defined in combination, this is by no means limiting. For example, it is possible to configure bit information that indicates whether or not there is a modification of system information (for example, one bit of "0" or "1") and bit information that indicates the contents of modifications (for example, 1 bit or more). In this case, an MTC terminal can judge whether or not there is a modification of system information from the bit information that serves to indicate whether or not there is a modification of system information, and, if system information is to be changed, control the modification of system information based on the bit information that indicates the content of the modification. When no modification is to be made to system information, it is possible not to configure a bit field that corresponds to the content of modification (for example, 0 bit).

<System Information Changing Operation>

The radio base station can include modification order information (bit information), including the content of modification of system information, shown in FIG. 4, in a predetermined DL signal, and transmit this to an MTC terminal.

When system information is not changed, the radio base station transmits the information to indicate that system information is not changed (for example, the bit information "00" in FIGS. 4A and 4B), to the MTC terminal. When the bit information "00" is received, the MTC terminal judges that no modification is made to the system information, and does not start the system information changing operation.

When system information is to be changed, the radio base station transmits the information that indicates the content of the modification of system information (for example, the bit information "01," "10" and "11" in FIGS. 4A and 4B) to the MTC terminal. Based on the bit information received, the MTC terminal operates to change a part or all of the system information. For example, when the system information is to be changed significantly, the radio base station transmits the bit information "01" to the MTC terminal. When the bit information "01" is received, the MTC terminal starts the system information changing operation from receiving SIB1. Note that changing all the system information can mean changing the MIB and all the SIBs, changing all the SIBs, or following the changing operation of existing systems.

When the system information is to be changed partially, the radio base station transmits the bit information "10" or "11" to the MTC terminal depending on the content of the modification. For example, when a part or all of the SIBs included in SI-X are to be changed, the radio base station transmits the bit information "10." The MTC terminal, receiving the bit information "01," can change only the system information (SIB) that corresponds to SI-X, in the system information changing operation. Also, when a part or all of the SIBs included in SI-Y are to be changed, the radio base station transmits the bit information "11." The MTC terminal, receiving the bit information "11," can change only the system information (SIB) that corresponds to SI-Y, in the system information changing operation.

Note that it is possible to additionally configure system information which the MTC terminal always acquires during the changing operation regardless of the content of modification of system information. In this case, even if the bit information to order a modification of a part of the system information (for example, the bit information "10" in FIGS. 4A and 4B) is received, the MTC terminal acquires the system information which the MTC terminal is obligated to always acquire, in addition to the part of the system information that corresponds to the bit information "10."

<Variation>

Although a case has been described with reference to FIG. 4, where SIs (SI windows) are configured to show the contents of modifications of system information, the present embodiment is by no means limited to this. For example, the contents of modifications of system information may be defined by using predetermined SIBs, instead of SIs (see FIG. 5). In this case, one SIB can be defined in association with one piece of bit information (for example, "10" and/or "11") (see FIG. 5A). Alternatively, a plurality of SIBs (for example, a plurality of SIBs with linked contents) can be defined in association with one piece of bit information (see FIG. 5B).

In this way, by reporting modifications (updates) of predetermined SIBs to an MTC terminal as information to relates to the contents of modifications of system information, it becomes possible to control the system changing operation in the MTC terminal in greater detail, and, furthermore, shorten the time it takes to change the system information.

Also, it is also possible to configure the content of modification, corresponding to a predetermined piece of bit information, based on information that is reported from the radio base station. For example, the radio base station can report information related to the content of modification to the MTC terminal semi-statically, by using MTC-SIBs (see FIG. 6).

FIG. 6 shows the case where the contents of modifications of system information corresponding to the bit information "10" and "11" are configured by using MTC-SIB1. The MTC terminal can control the system information changing operation based on the content of modification configured by the radio base station in advance by using MTC-SIB1, and based on the information to order a modification of system information, which is transmitted in a DL signal. In this way, by configuring the contents of modifications of system information semi-statically, it is possible to control the system information changing operation in the MTC terminal flexibly.

Note that, in FIG. 6, in which the contents of modifications are defined by using MTC-SIBs, SIBs may be defined instead of SIs. Furthermore, although cases have been described with reference to FIG. 4 to FIG. 6 where the information to order a modification of system information is defined by using a bit field of 2 bits, the present embodiment is by no means limited to this. It is equally possible to define a plurality of contents of modifications by using a bit field of three or more bits.

Second Example

In accordance with a second example, the method of transmitting information that orders a modification of system information to an MTC terminal will be described.

As described above, a radio base station can include information that orders a modification of system information in a predetermined DL signal and report this to an MTC terminal. For example, the radio base station includes and reports the information that orders a modification of system information (information related to the content of modification of system information) in paging information that is transmitted in a downlink shared channel. To be more specific, the radio base station can include the above-described predetermined bit information of the first example in the PDSCH for paging information, and report this to the MTC terminal. In this case, the radio base station can include the allocation of the PDSCH that contains the paging information, in downlink control information that is transmitted in a downlink control channel (for example, the MPDCCH), and report this to the MTC terminal.

The MTC terminal receives the paging information based on DCI (for example, P-RNTI-scrambled DCI) that is transmitted in the downlink control channel in a predetermined period (for example, PO). Then, the MTC terminal controls the system information changing operation based on the system information modification order information included in the paging information.

Also, the radio base station can configure and transmit the information to order a modification of system information in a bit field in the DCI (for example, P-RNTI-scrambled DCI) that is transmitted in the downlink control channel during a predetermined period. To be more specific, the radio base station includes and the above-described predetermined bit information of the first example in the DCI and reports this to the MTC terminal. In this case, the radio base station can arrange the system information modification order information in the common search space of the MPDCCH. Alternatively, the radio base station may arrange the system information modification order information in the user-specific search space.

By reporting information related to the content of modification of system information to the MTC terminal by using downlink control information, it is possible to shorten the time it takes before receiving the information to order an update of system information. As a result, even when the MTC terminal employs coverage enhancement, it is still possible to shorten the time it takes to change the system information, and make adequate communication.

<Configuration of Flag in DCI>

Furthermore, it is possible to configure a bit for a flag (also referred to as "S_flag") in the DCI that is transmitted in the downlink control channel in a predetermined period (for example, PO), and control the receipt of the modification order information in the MTC terminal based on this flag (bit information). The flag to be placed in the DCI can be configured with a predetermined number of bits (for example, one bit (bit information "0" or "1")). Now, the case will be described below in which the flag is configured using one bit ("1" or "0").

When the flag included in the DCI is "1" (S_flag=TRUE), a structure can be employed, in which scheduling information (allocation information) of the PDSCH, to which paging information is allocated, is configured in a bit field that is configured after the flag in the DCI (see FIG. 7A). FIG. 7A shows the case where the MCS and other pieces of information, the flag (bit information "1"), and allocation (scheduling) information of the PDSCH that contains paging information are included and transmitted in the DCI.

When the flag included in the DCI is "1" (S_flag=TRUE), the MTC terminal judges that the bit information in the bit field after this flag is allocation information of the PDSCH for paging information, and receives paging information based on this allocation information. Also, when information related to the content of modification of system information (for example, the bit information "10" and "11" in FIG. 4 to FIG. 6) is included in the paging information, the MTC terminal performs the system information changing operation with respect to a limited portion of the system information.

Furthermore, when the flag included in the DCI is "0" (S_flag=FALSE), a structure can be employed, in which modification order information, including the content of modification of system information, is configured in a bit field that is configured after the flag in the DCI (see FIG. 7B). Also, ETWS, CMAS, EAB and other notifications may be configured besides the modification order information. That is, FIG. 7B shows a case where information that is equivalent to paging information is configured in a DCI bit field.

Furthermore, in FIG. 7B, allocation (scheduling) information of the PDSCH for paging information is not included in the DCI, and information that is equivalent to paging information (information that orders a modification of system information and/or suchlike information) is directly configured. Note that a structure in which each MTC terminal's paging record is not configured in DCI can be used here.

When the flag included in the DCI is "0" (S_flag=FALSE), the MTC terminal judges that the bit information configured in the bit field after this DCI is information that orders a modification of system information, and/or suchlike information. Then, based on the system information modification order information included in the DCI, the MTC terminal performs the system information changing operation. Also, when information related to the content of modification (for example, the bit information "10" and "11" in FIG. 4 to FIG. 6) is included in the information that orders a modification of system information the MTC terminal performs the system information changing operation with respect to a limited portion of the system information.

Note that the order of bit fields to be configured in DCI is by no means limited to the order shown in FIG. 7. Also, as shown in FIG. 7B, when information that is equivalent to paging information is included in DCI, it is possible to include padding bits (zero padding) and so on in order to adjust the size of the DCI.

In this way, when information to order a modification of system information is reported by using downlink control information, an MTC terminal can judge the content of the modification of system information without performing the receiving processes (decoding, etc.) of paging information that is allocated to the PDSCH. By this means, it is possible to shorten the period it takes the MTC terminal to receive the information that orders a modification of system information.

Furthermore, by configuring a flag (S_flag) in DCI, the MTC terminal can adequately learn in which of the DCI and the paging information in the PDSCH information such as information that orders a modification of system information is arranged.

<Variation>

Although a structure has been shown with FIG. 7 in which the content of modification of system information can be reported in both cases in which information such as a system information modification order is transmitted in DCI (S_flag=FALSE) and transmitted in the paging information in the PDSCH (S_flag=TRUE), this is by no means limiting.

For example, it is possible to use a structure in which information related to the content of modification of system information can be reported only in one of these cases.

For example, when information such as a system information modification order is included in DCI (S_flag=FALSE) information related to the content of the modification of system information (for example, a bit field formed with multiple bits) is included in the DCI. On the other hand, if information such as a system information modification order is included in the paging information in the PDSCH (S_flag=TRUE), the information related to the content of the modification of system information is not included in the paging information, and, instead, information as to whether or not there is a modification of system information (for example, one bit) is included.

That is, when a modification of system information is ordered in PDSCH paging information, the MTC terminal performs the changing operation as in existing systems (for example, starts receiving from SIB1). On the other hand, when a modification of system information is ordered by using DCI, the MTC terminal controls the modification of a part or all of the system information based on the predetermined bit information transmitted from the radio base station according to the content of the modification of system information.

In this case, if all or a significant portion of the system information is to be changed, the radio base station reports information that orders a modification of system information (existing SystemInfoModification) to the MTC terminal by using PDSCH paging information as in existing systems. Also, if the system information is to be changed only partially, a structure may be used in which the modification order information (enhanced SystemInfoModification), including the content of the modification of system information, is reported to the MTC terminal by using DCI. By this means, it is possible to use the mechanism of existing systems, and, furthermore, order an MTC terminal to operate to change system information by using DCI only when predetermined conditions are met (for example, when a specific piece of system information is changed).

Alternatively, when information such as system information modification order is included in the paging information of the PDSCH (S_flag=TRUE), information related to the content of the modification of system information (a bit field formed with multiple bits) is included in the paging information. On the other hand, when information such as a system information modification order is included in DCI (S_flag=FALSE), the information related to the content of the modification of system information is not included in the DCI, and, instead, information as to whether or not there is a modification of system information (for example, one bit) is included.

That is, when a modification of system information is ordered in DCI, the MTC terminal performs the changing operation as in existing systems (for example, starts receiving from SIB1). On the other hand, when a modification of system information is ordered by using paging information, the MTC terminal controls the modification of a part or all of the system information based on the predetermined bit information reported from the radio base station according to the content of the modification of system information.

Also, when information such as a system information modification order is included in DCI (S_flag=FALSE), whether or not the content of the modification of system information can be reported may be controlled based on the format that is applied to this DCI (DCI format). For example, it is possible to include modification order information, including information related to the content of the modification of system information, in all the DCI formats (for example, DCI format 1A, DCI format 1C, a new DCI format, etc.) that can be applied to the DCI transmitted in a predetermined period (PO).

Alternatively, it may be possible to configure a bit field (for example, 2 or more bits), in which information related to the content of modification of system information can be reported, only in a predetermined DCI format (for example, DCI format 1A, DCI format 1C, a new DCI format, etc.). In this case, in the other DCI formats, it suffices to configure only a bit field (for example, one bit) that indicates whether or not there is a modification of system information, as in existing systems. Note that, ETWS, CMAS, EAB and so on can be configured in each DCI format.

Note that, when information such as a system information modification order is included in DCI (DCI format) and transmitted to a MTC terminal, this may be configured in the common search space, or may be configured in the UE-specific search space.

<System Information Tag>

In existing LTE systems, a tag (systemInfoValueTag), the value of which increases following the modifications of system information, is provided in system information (SIB1). For example, when a modification is made to system information, a radio base station increases systemInfoValueTag of SIB1 by one and transmits this. A user terminal, receiving SIB1, judges whether or not the system information which the user terminal already holds (stores) is valid, based on systemInfoValueTag included in this SIB1.

For example, assuming the case where the user terminal returns from outside the coverage, if systemInfoValueTag that is included in newly received SIB1 and systemInfoValueTag that is already held have the same value, the user terminal can judge that the system information that is held is valid. Also, the user terminal can judge that the system information that is held is no longer valid (invalid) after a predetermined period (for example, 3 hours) has passed since the last time the system information was judged valid.

In this way, the user terminal can judge the validity of system information which the user terminal holds, based on systemInfoValueTag included in SIB1. Note that, depending on the contents of system information (for example, system information related to ETWS (Earthquake and Tsunami Warning System), CMAS (Commercial Mobile Alert Service) and EAB (Extended Access Barring) such as SIB10, SIB11, SIB12, SIB14 and so on), there are cases where the value of systemInfoValueTag does not increase even when the contents of system information are changed.

Meanwhile, as described above, according to the present embodiment, a user terminal can receive modification order information, including the content of modification of system information, in downlink control information (S_flag=FALSE), or in paging information that is transmitted in the PDSCH (S_flag=TRUE) (see FIG. 7). In this case, there is a possibility that, depending on the content of the modification of system information, SIB1 is not received. As a result, cases might occur where systemInfoValueTag that is held in the user terminal is not updated even when system information is changed (when the value of systemInfoValueTag of SIB1 is increases).

Consequently, the user terminal can be structured to operate without taking into consideration (that is, by disregarding) systemInfoValueTag included in SIB1, when modification order information, including the content of modification of system information, is received in downlink control information (S_flag=FALSE) and/or in paging information that is transmitted in the PDSCH (S_flag=TRUE). By this means, even when a part of the system information is changed, it is possible to prevent the user terminal from making wrong decisions based on systemInfoValueTag included in SIB1.

Note that, user terminal may be structured to disregard systemInfoValueTag in all cases in which change order information including the content of modification of system information is received. Alternatively, the user terminal may be structured not to disregard systemInfoValueTag when SIB1 receiving operation is indicated in the content of the modification of system information.

Figure 14:
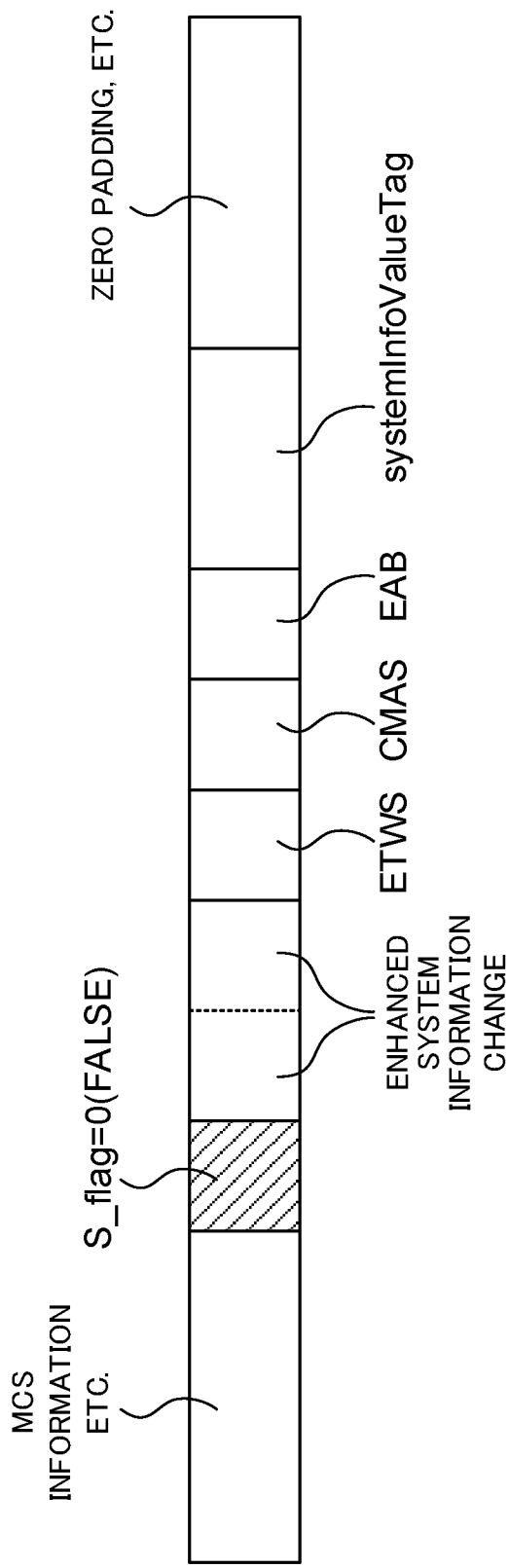
FIG. 14 is a diagram to show another example of the method of transmitting information that orders a modification of system information, according to the second example.

Furthermore, a structure may be employed here, in which systemInfoValueTag is included in downlink control information, in which modification order information, including the content of modification of system information, is transmitted (S_flag=FALSE), and/o in paging information that is transmitted in the PDSCH (S_flag=TRUE) (see FIG. 14). Note that FIG. 14 shows a case where, when downlink control information, in which modification order information, including the content of modification of system information, is transmitted, is transmitted (S_flag=FALSE), information that relates to systemInfoValueTag is included in this downlink control information.

In this way, by including information that relates to systemInfoValueTag, in addition to modification order information, including the content of modification of system information, the user terminal can update systemInfoValueTag even when SIB1 is not received. Also, in this case, the user terminal can be structured not to disregard systemInfoValueTag of SIB1.

Note that, regardless of whether the content of modification of system information (which SI or SIB is changed) is reported by using downlink control information (S_flag=FALSE) or by using paging information that is transmitted in the PDSCH (S_flag=TRUE), the user terminal may operate to always acquire specific system information (for example, SIB1, MIB, etc.).

(Radio Communication System)

Now, the structure of the radio communication system according to an embodiment of the present invention will be described below. In this radio communication system, the radio communication methods according to the above-described embodiments of the present invention are employed. Note that the radio communication methods of the above-described embodiments may be applied individually or may be applied in combination. Here, although MTC (NB-IoT) terminals will be shown as exemplary user terminals that are limited to using a narrow band as the band for their use, the present invention is by no means limited to MTC terminals.

Figure 8:
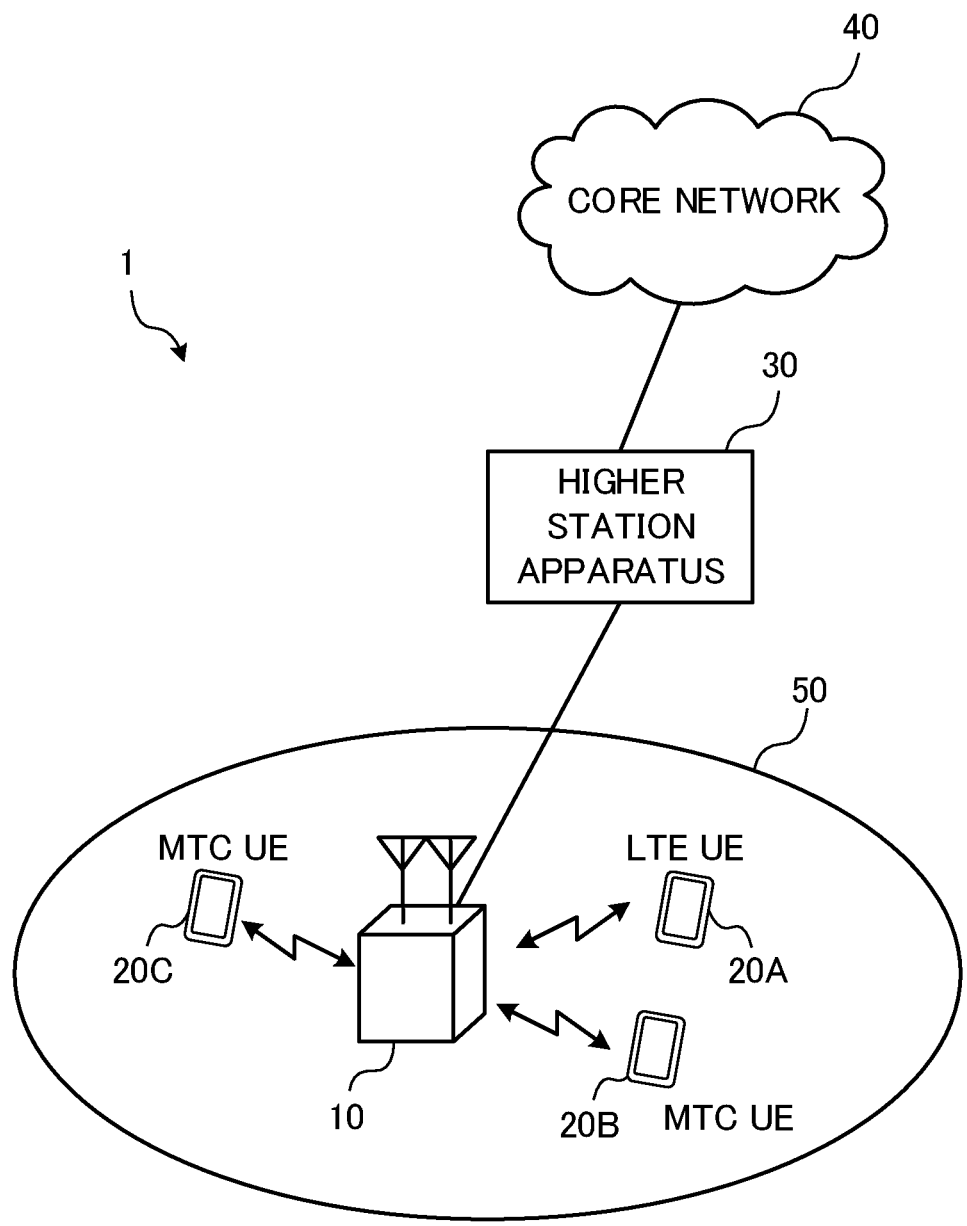
FIG. 8 is a diagram to show a schematic structure of a radio communication system according to an embodiment of the present invention.

FIG. 8 is a diagram to show a schematic structure of the radio communication system according to an embodiment of the present invention. The radio communication system 1 shown in FIG. 8 is an example of employing an LTE system in the network domain of a machine communication system. The radio communication system 1 can adopt carrier aggregation (CA) and/or dual connectivity (DC) to group a plurality of fundamental frequency blocks (component carriers) into one, where the LTE system bandwidth constitutes one unit. Also, although, in this LTE system, the system band is configured to maximum 20 MHz in both the downlink and the uplink, this configuration is by no means limiting.

Note that the radio communication system 1 may be referred to as "LTE" (Long Term Evolution), "LTE-A" (LTE-Advanced), "LTE-B" (LTE-Beyond), "SUPER 3G," "IMT-Advanced," "4G" (4th generation mobile communication system), "5G" (5th generation mobile communication system), "FRA" (Future Radio Access), "New-RAT" (Radio Access Technology) and so on, or may be seen as a system to implement these.

The radio communication system 1 is comprised of a radio base station 10 and a plurality of user terminals 20A, 20B and 20C that are connected with the radio base station 10. The radio base station 10 is connected with a higher station apparatus 30, and connected with a core network 40 via the higher station apparatus 30. Note that the higher station apparatus 30 may be, for example, an access gateway apparatus, a radio network controller (RNC), a mobility management entity (MME) and so on, but is by no means limited to these.

A plurality of user terminal 20A, 20B and 20C can communicate with the radio base station 10 in a cell 50. For example, the user terminal 20A is a user terminal that supports LTE (up to Rel-10) or LTE-Advanced (including Rel-10 and later versions) (hereinafter referred to as an "LTE terminal"), and the other user terminals 20B and 20C are MTC terminals that serve as communication devices in machine communication systems. Hereinafter the user terminals 20A, 20B and 20C will be each simply referred to as a "user terminal 20," unless specified otherwise.

Note that the MTC terminals 20B and 20C are terminals that support various communication schemes including LTE and LTE-A, and are by no means limited to stationary communication terminals such electric meters, gas meters, vending machines and so on, and can be mobile communication terminals such as vehicles. Furthermore, the user terminals 20 may communicate with other user terminals 20 directly, or communicate with other user terminals 20 via the radio base station 10.

In the radio communication system 1, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combination of these.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and predetermined SIBs (System Information Blocks) are communicated in the PDSCH. Also, the MIB (Master Information Blocks) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI) including PDSCH and PUSCH scheduling information is communicated by the PDCCH. The number of OFDM symbols to use for the PDCCH is communicated by the PCFICH. HARQ delivery acknowledgement signals (ACKs/NACKs) in response to the PUSCH are communicated by the PHICH. The EPDCCH is frequency-division-multiplexed with the PDSCH and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. The PUSCH may be referred to as an uplink data channel. User data and higher layer control information are communicated by the PUSCH. Furthermore, uplink control information (UCI) such as downlink radio quality information (CQI: Channel Quality Indicator), delivery acknowledgement signals (ACK/NACK) and so on are communicated by the PUCCH. By means of the PRACH, random access preambles for establishing connections with cells are communicated.

Note that the channels for MTC terminals may be shown with an "M" or an "NB," and, for example, the EPDCCH, the PDSCH, the PUCCH and the PUSCH for MTC terminals may be referred to as the MPDCCH, the MPDSCH, the MPUCCH and the MPUSCH, or may be referred to as the NB-PDCCH, the NB-PDSCH, the NB-PUCCH and the NB-PUSCH.

In the radio communication systems 1, the cell-specific reference signal (CRS: Cell-specific Reference Signal), the channel state information reference signal (CSI-RS: Channel State Information-Reference Signal), the demodulation reference signal (DMRS: DeModulation Reference Signal), the positioning reference signal (PRS: Positioning Reference Signal) and so on are communicated as downlink reference signals. Also, in the radio communication system 1, the measurement reference signal (SRS: Sounding Reference Signal), the demodulation reference signal (DMRS) and so on are communicated as uplink reference signals. Note that, DMRSs may be referred to as "user terminal-specific reference signals" (UE-specific Reference Signals). Also, the reference signals to be communicated are by no means limited to these.

(Radio Base Station)

Figure 9:
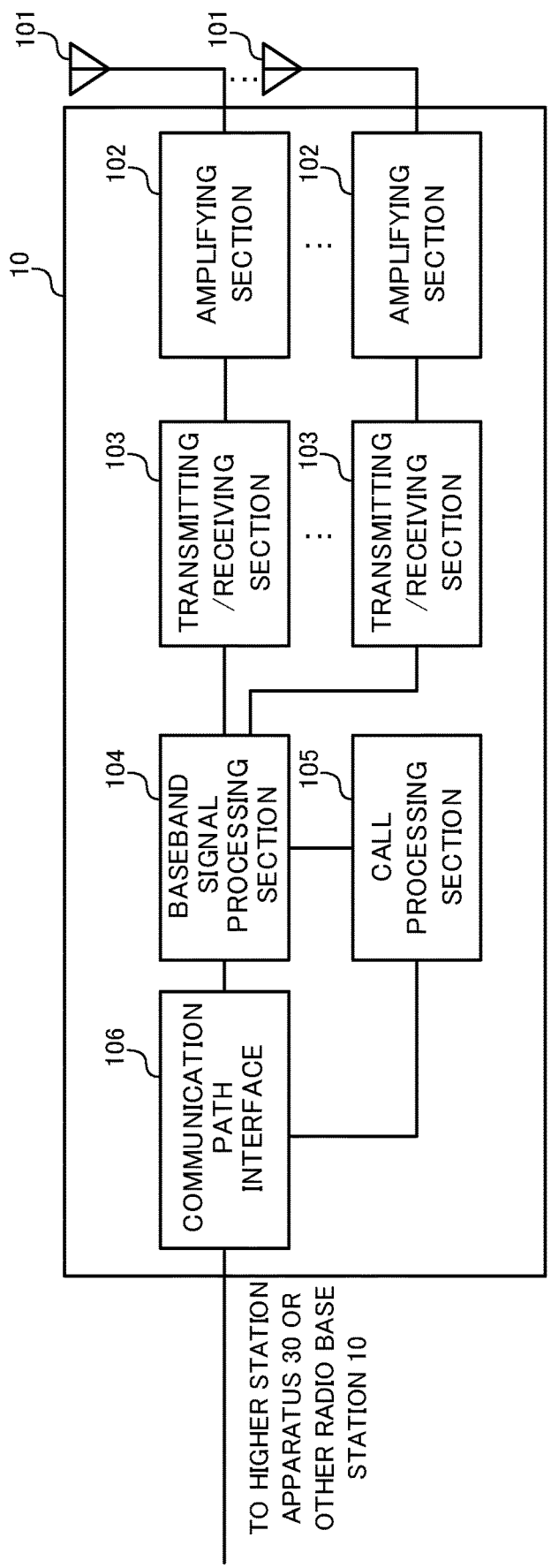
FIG. 9 is a diagram to show an example of an overall structure of a radio base station according to an embodiment of the present invention.

FIG. 9 is a diagram to show an example of an overall structure of a radio base station according to an embodiment of the present invention. A radio base station 10 has a plurality of transmitting/receiving antennas 101, amplifying sections 102, transmitting/receiving sections 103, a baseband signal processing section 104, a call processing section 105 and a communication path interface 106.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as an RLC retransmission control transmission process, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Each transmitting/receiving section 103 converts baseband signals that are pre-coded and output from the baseband signal processing section 104 on a per antenna basis, into a radio frequency band. The transmitting/receiving sections 103 can be constituted by transmitters/receivers, transmitting/receiving circuits or transmitting/receiving devices that can be described based on common understanding of the technical field to which the present invention pertains. Note that a transmitting/receiving section 103 may be structured as a transmitting/receiving section in one entity, or may be constituted by a transmitting section and a receiving section.

The radio frequency signals having been subjected to frequency conversion in the transmitting/receiving sections 103 are amplified in the amplifying sections 102, and transmitted from the transmitting/receiving antennas 101. The transmitting/receiving sections 103 can transmit and/or receive various signals in a narrow bandwidth (for example, 1.4 MHz) that is more limited than a system band (for example, one component carrier).

Meanwhile, as for uplink signals, radio frequency signals that are received in the transmitting/receiving antennas 101 are each amplified in the amplifying sections 102. Each transmitting/receiving section 103 receives uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (for example, an interface in compliance with the CPRI (Common Public Radio Interface)m such as optical fiber, the X2 interface).

Note that the transmitting/receiving sections 103 (transmitting sections) transmit information that orders a modification of system information, to the user terminal 20. When a modification is to be made to system information, modification order information, which includes information related to the content of the modification of system information, can be reported to the user terminals 20. Also, the transmitting/receiving section 103 (transmitting section) can include the information that orders a modification of system information in a predetermined DL signal/DL channel (for example, DCI that is transmitted in a downlink control channel, paging information that is transmitted in downlink shared channel, and so on). Also, the transmitting/receiving section 103 (transmitting section) may transmit an MPDCCH to contain downlink control information and/or a PDSCH to contain paging information in repetitions.

Figure 10:
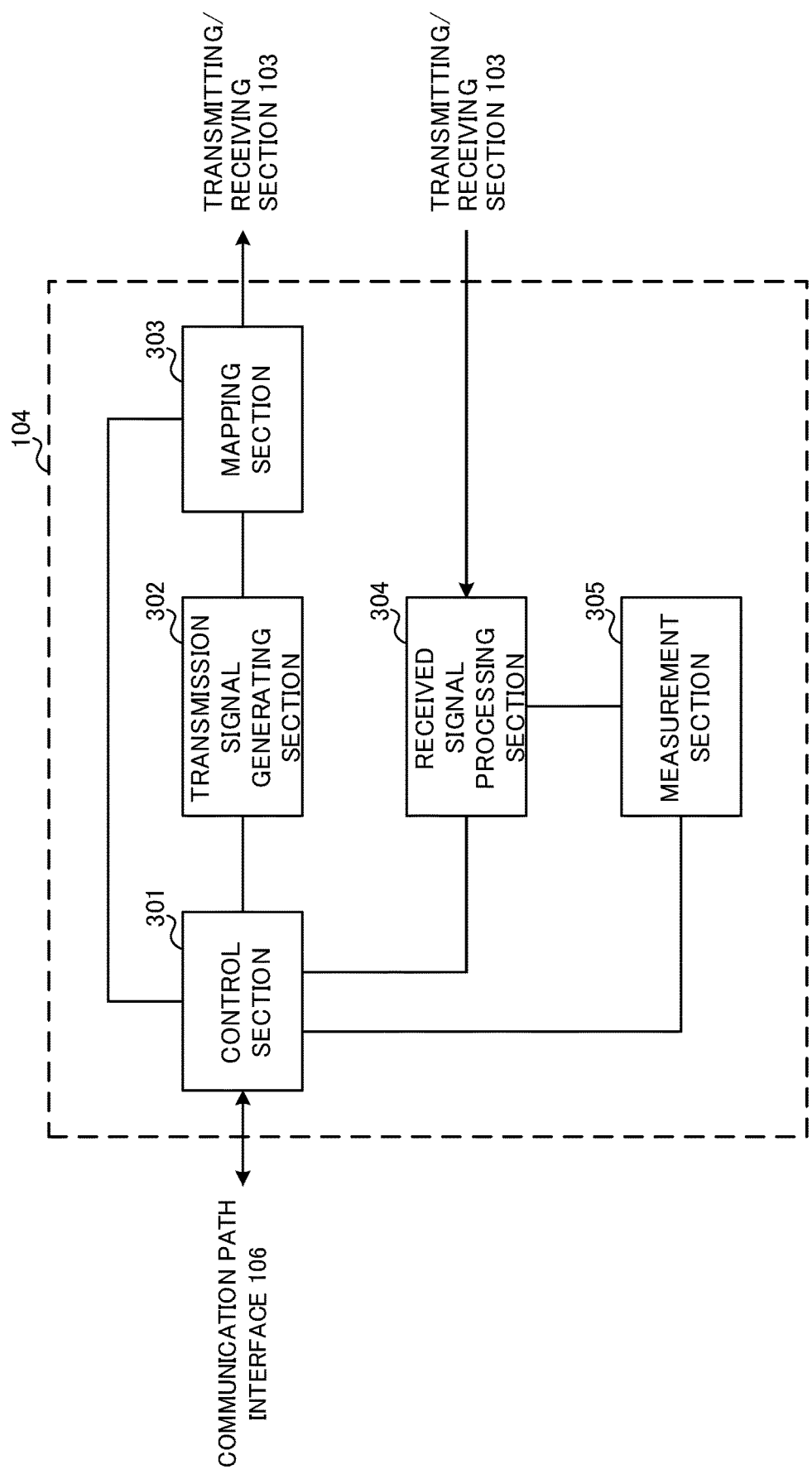
FIG. 10 is a diagram to show an example of a functional structure of a radio base station according to an embodiment of the present invention.

FIG. 10 is a diagram to show an example of a functional structure of a radio base station according to one embodiment of the present invention. Note that, although FIG. 10 primarily shows functional blocks that pertain to characteristic parts of the present embodiment, the radio base station 10 has other functional blocks that are necessary for radio communication as well. As shown in FIG. 10, the baseband signal processing section 104 has a control section (scheduler) 301, a transmission signal generating section (generating section) 302, a mapping section 303, a received signal processing section 304 and a measurement section 305.

The control section (scheduler) 301 controls the whole of the radio base station 10. The control section 301 can be constituted by a controller, a control circuit or a control device that can be described based on common understanding of the technical field to which the present invention pertains.

The control section 301, for example, controls the generation of signals in the transmission signal generating section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of downlink data signals that are transmitted in the PDSCH and downlink control signals that are communicated in the PDCCH and/or the EPDCCH, the MPDCCH and so on. Also, the control section 301 controls the scheduling of downlink reference signals such as synchronization signals (for example, the PSS (Primary Synchronization Signal)/SSS (Secondary Synchronization Signal)), the CRS, the CSI-RS, the DM-RS and so on.

Also, the control section 301 controls the scheduling of uplink data signals transmitted in the PUSCH, uplink control signals transmitted in the PUCCH and/or the PUSCH (for example, delivery acknowledgement signals (HARQ-ACKs)), random access preambles transmitted in the PRACH, uplink reference signals and so on.

The control section 301 controls the transmission signal generating section 302 and the mapping section 303 to allocate various signals to a narrow band and transmit these to the user terminals 20. For example, the control section 301 controls downlink broadcast information (the MIB, SIBs (MTC-SIBs), etc.), the MPDCCH, the PDSCH and so on to be transmitted in a narrow band.

Also, the control section 301 transmits PDSCHs to the user terminals 20 in predetermined narrow bands. Note that, when the radio base station 10 employs coverage enhancement, for example, the control section 301 may configure the number of repetitions for a DL/UL signal for a predetermined user terminal 20, and transmit the DL signal/UL signal in repetitions based on this number of repetitions. Furthermore, the control section 301 may control information about the number of repetitions to be reported to the user terminal 20 in a control signal (DCI) in the MPDCCH or by using higher layer signaling (for example, RRC signaling, broadcast information, etc.).

The transmission signal generating section 302 generates downlink signals (downlink control signals, downlink data signals, downlink reference signals and so on) based on commands from the control section 301, and outputs these signals to the mapping section 303. The transmission signal generating section 302 can be constituted by a signal generator, a signal generating circuit or a signal generating device that can be described based on common understanding of the technical field to which the present invention pertains.

For example, the transmission signal generating section 302 generates DL assignments, which report downlink signal allocation information, and UL grants, which report uplink signal allocation information, based on commands from the control section 301. For example, the transmission signal generating section 302 generates downlink control information and/or paging information containing modification order information, which includes information related to the content of modification of system information. Also, the downlink data signals are subjected to a coding process and a modulation process, based on coding rates and modulation schemes that are selected based on channel state information (CSI) from each user terminal 20 and so on.

The mapping section 303 maps the downlink signals generated in the transmission signal generating section 302 to predetermined narrow band radio resources (for example, maximum 6 resource blocks) based on commands from the control section 301, and outputs these to the transmitting/receiving sections 103. The mapping section 303 can be constituted by a mapper, a mapping circuit or a mapping device that can be described based on common understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals and so on). For the received signal processing section 304, a signal processor, a signal processing circuit or a signal processing device that can be described based on common understanding of the technical field to which the present invention pertains can be used.

The received signal processing section 304 outputs the decoded information acquired through the receiving processes to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or a measurement device that can be described based on common understanding of the technical field to which the present invention pertains.

The received signal processing section 304 may measure the signal received power (for example, RSRP (Reference Signal Received Power)), the received quality (for example, RSRQ (Reference Signal Received Quality)), channel states and so on. The measurement results may be output to the control section 301.

(User Terminal)

Figure 11:
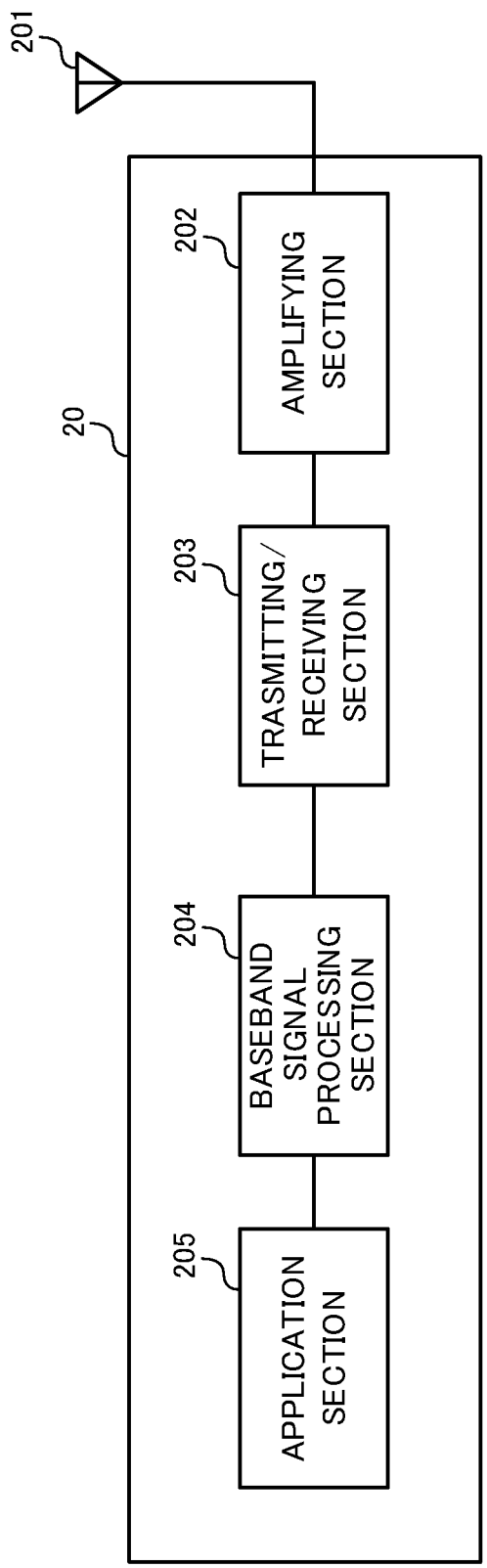
FIG. 11 is a diagram to show an example of an overall structure of a user terminal according to an embodiment of the present invention.

FIG. 11 is a diagram to show an example of an overall structure of a user terminal according to one embodiment of the present invention. Note that, although not described in detail herein, normal LTE terminals may operate to act as MTC terminals. A user terminal 20 has a transmitting/receiving antenna 201, an amplifying section 202, a transmitting/receiving section 203, a baseband signal processing section 204 and an application section 205. Also, the user terminal 20 may have a plurality of transmitting/receiving antennas 201, amplifying sections 202, transmitting/receiving sections 203 and/or others.

A radio frequency signal that is received in the transmitting/receiving antenna 201 is amplified in the amplifying section 202. The transmitting/receiving section 203 receives the downlink signal amplified in the amplifying section 202.

The received signal is subjected to frequency conversion and converted into the baseband signal in the transmitting/receiving section 203, and output to the baseband signal processing section 204. The transmitting/receiving section 203 can be constituted by a transmitters/receiver, a transmitting/receiving circuit or a transmitting/receiving device that can be described based on common understanding of the technical field to which the present invention pertains. Note that the transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to the transmitting/receiving section 203.

The baseband signal that is output from the baseband signal processing section 204 is converted into a radio frequency bandwidth in the transmitting/receiving section 203. The radio frequency signal that is subjected to frequency conversion in the transmitting/receiving section 203 is amplified in the amplifying section 202, and transmitted from the transmitting/receiving antenna 201.

The transmitting/receiving section 203 (receiving section) receives modification order information, including information related to the content of modification of system information, from the radio base station 10. For example, in the modification order information to indicate that system information is not changed, and information to indicate the content of modification when system information is changed are defined as different pieces of bit information in the same bit field. The information related to the content of modification of system information may be configured to include information that represents a predetermined system information window (SI) and/or a system information block (SIB). Also, the transmitting/receiving section 203 (receiving section) can receive at least one piece of information related to the content of modification of system information in advance, via system information.

Also, the transmitting/receiving section 203 (receiving section) receives the modification order information in downlink control information to which a paging message identifier (P-RNTI), and/or a paging message that is allocated to a downlink shared channel (PDSCH). Furthermore, the downlink control information can be structured to include at least one of an ETWS (Earthquake and Tsunami Warning System) bit field, a CMAS (Commercial Mobile Alert Service) bit field and an EAB (Extended Access Barring) bit field, in addition to the bit field for indicating the modification order information, and not include allocation information of a downlink shared channel.

Figure 12:
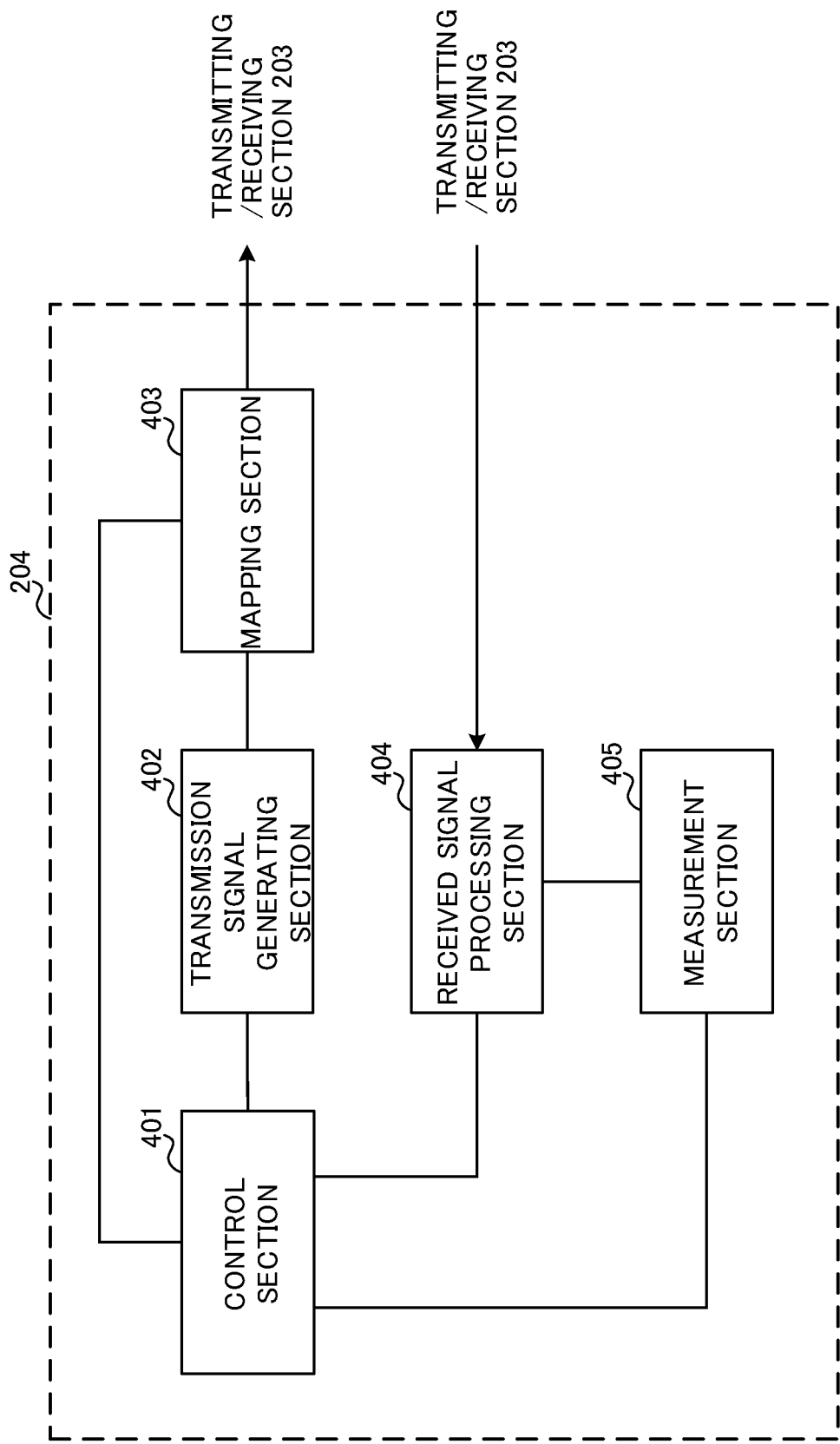
FIG. 12 is a diagram to show an example of a functional structure of a user terminal according to an embodiment of the present invention.

FIG. 12 is a diagram to show an example of a functional structure of a user terminal according to one embodiment of the present invention. Note that, although FIG. 12 primarily shows functional blocks that pertain to characteristic parts of the present embodiment, the user terminal 20 has other functional blocks that are necessary for radio communication as well. As shown in FIG. 12, the baseband signal processing section 204 provided in the user terminal 20 has a control section 401, a transmission signal generating section (generating section) 402, a mapping section 403, a received signal processing section 404 and a measurement section 405.

The control section 401 controls the whole of the user terminal 20. For the control section 401, a controller, a control circuit or a control device that can be described based on common understanding of the technical field to which the present invention pertains can be used.

The control section 401, for example, controls the generation of signals in the transmission signal generating section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals (signals transmitted in the PDCCH/EPDCCH) and downlink data signals (signals transmitted in the PDSCH) transmitted from the radio base station 10, from the received signal processing section 404. The control section 401 controls the generation of uplink control signals (for example, delivery acknowledgement signals (HARQ-ACKs) and so on) and uplink data signals based on the downlink control signals, the results of deciding whether or not re transmission control is necessary for the downlink data signals, and so on. Also, the control section 401 controls the processes in the random access procedure, and, for example, controls the transmission of random access preambles (PRACH).

Furthermore, when information that relates to the content of modification of system information is included in modification order information that is reported from the radio base station 10, the control section 401 exerts control so that a part or all of the system information is changed based on the information related to the content of modification. Also, based on a predetermined flag included in downlink control information, the control section 401 can judge whether the modification order information is included in the downlink control information or in a paging message allocated in a shared channel.

The transmission signal generating section 402 generates uplink signals (uplink control signals, uplink data signals, uplink reference signals and so on) based on commands from the control section 401, and outputs these signals to the mapping section 403. The transmission signal generating section 402 can be constituted by a signal generator, a signal generating circuit or a signal generating device that can be described based on common understanding of the technical field to which the present invention pertains.

For example, the transmission information generating section 402 generates uplink control signals such as delivery acknowledgement signals (HARQ-ACKs), channel state information (CSI) and so on, based on commands from the control section 401. Also, the transmission signal generating section 402 generates uplink data signals based on commands from the control section 401. For example, when a UL grant is included in a downlink control signal that is reported from the radio base station 10, the control section 401 commands the transmission signal generating section 402 to generate an uplink data signal.

The mapping section 403 maps the uplink signals generated in the transmission signal generating section 402 to radio resources (maximum 6 resource blocks) based on commands from the control section 401, and outputs these to the transmitting/receiving sections 203. The mapping section 403 can be constituted by a mapper, a mapping circuit or a mapping device that can be described based on common understanding of the technical field to which the present invention pertains.

The received signal processing section 404 performs receiving processes (for example, demapping, demodulation, decoding and so on) of received signals that are input from the transmitting/receiving section 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or a signal processing device that can be described based on common understanding of the technical field to which the present invention pertains.

The received signal processing section 404 output the decoded information that is acquired through the receiving processes to the control section 401. The received signal processing section 404 outputs, for example, broadcast information, system information, RRC signaling, DCI and so on, to the control section 401. Also, the received signal processing section 404 outputs the received signals, the signals after the receiving processes and so on to the measurement section 405.

The measurement section 405 conducts measurements with respect to the received signals. The measurement section 405 can be constituted by a measurer, a measurement circuit or a measurement device that can be described based on common understanding of the technical field to which the present invention pertains.

The measurement section 405 may measure, for example, the received power (for example, RSRP), the received quality (for example, RSRQ), the channel states and so on of the received signals. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be implemented with one physically-integrated device, or may be implemented by connecting two physically-separate devices via radio or wire and using these multiple devices.

Figure 13:
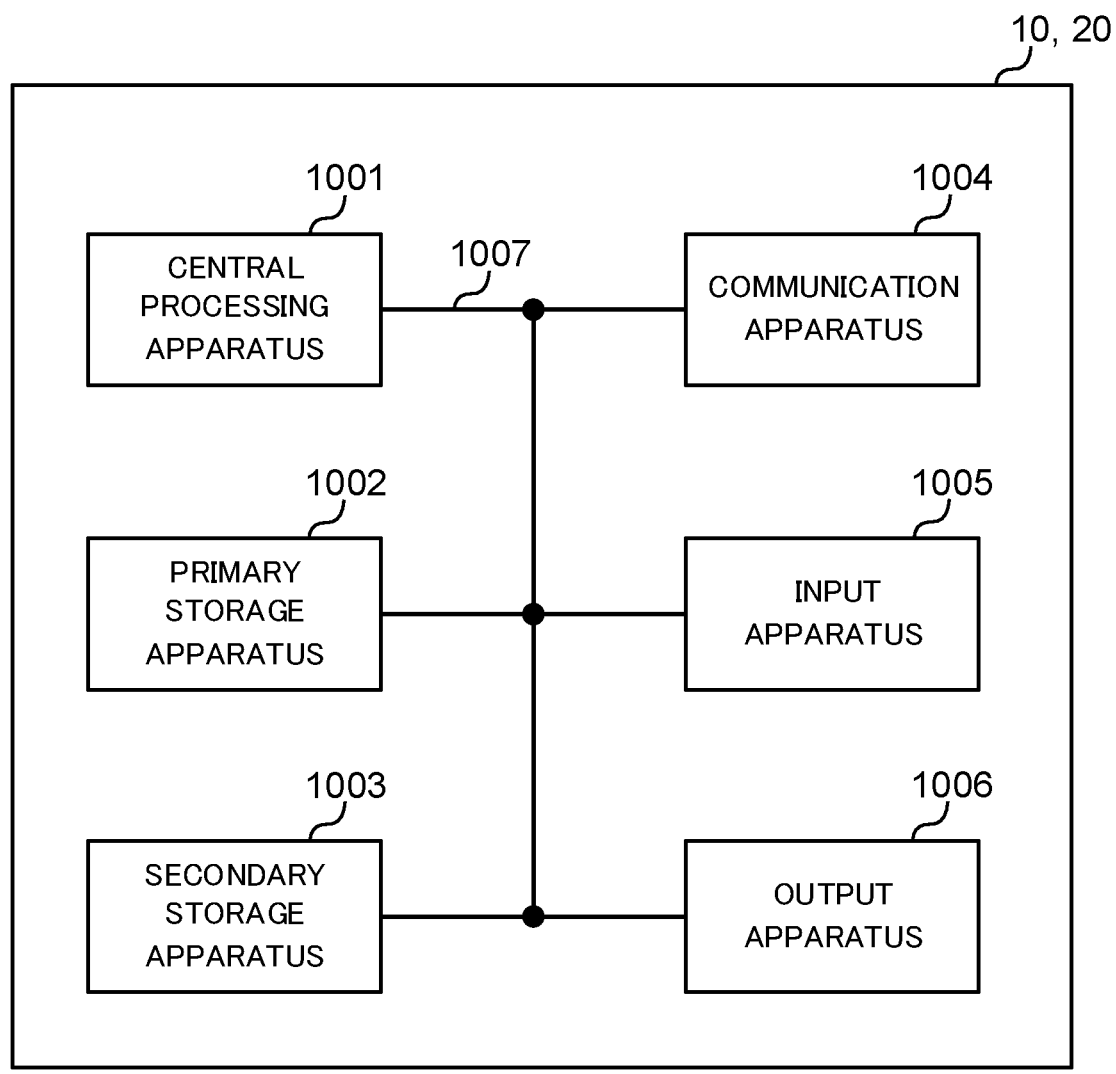
FIG. 13 is a diagram to show an example hardware structure of a radio base station and a user terminal according to an embodiment of the present invention.

That is, a radio base station, a user terminal and so on according to an embodiment of the present invention may function as a computer that executes the processes of the radio communication method of the present invention. FIG. 13 is a diagram to show an example hardware structure of a radio base station and a user terminal according to an embodiment of the present invention. Physically, a radio base station 10 and a user terminal 20, which have been described above, may be formed as a computer apparatus that includes a central processing apparatus (processor) 1001, a primary storage apparatus (memory) 1002, a secondary storage apparatus 1003, a communication apparatus 1004, an input apparatus 1005, an output apparatus 1006 and a bus 1007. Note that, in the following description, the word "apparatus" may be replaced by "circuit," "device," "unit" and so on.

Each function of the radio base station 10 and user terminal 20 is implemented by reading predetermined software (programs) on hardware such as the central processing apparatus 1001, the primary storage apparatus 1002 and so on, and controlling the calculations in the central processing apparatus 1001, the communication in the communication apparatus 1004, and the reading and/or writing of data in the primary storage apparatus 1002 and the secondary storage apparatus 1003.

The central processing apparatus 1001 may control the whole computer by, for example, running an operating system. The central processing apparatus 1001 may be formed with a processor (CPU: Central Processing Unit) that includes a control apparatus, a calculation apparatus, a register, interfaces with peripheral apparatus, and so on. For example, the above-described baseband signal process section 104 (204), call processing section 105 and so on may be implemented by the central processing apparatus 1001.

Also, the central processing apparatus 1001 reads programs, software modules, data and so on from the secondary storage apparatus 1003 and/or the communication apparatus 1004, into the primary storage apparatus 1002, and executes various processes in accordance with these. As for the programs, programs to allow the computer to execute at least part of the operations of the above-described embodiments may be used. For example, the control section 401 of the user terminal 20 may be stored in the primary storage apparatus 1002 and implemented by a control program that runs on the central processing apparatus 1001, and other functional blocks may be implemented likewise.

The primary storage apparatus (memory) 1002 is a computer-readable recording medium, and may be constituted by, for example, at least one of a ROM (Read Only Memory), an EPROM (Erasable Programmable ROM), a RAM (Random Access Memory) and so on. The secondary storage apparatus 1003 is a computer-readable recording medium, and may be constituted by, for example, at least one of a flexible disk, an opto-magnetic disk, a CD-ROM (Compact Disc ROM), a hard disk drive and so on.

The communication apparatus 1004 is hardware (transmitting/receiving device) for allowing inter-computer communication by using wired and/or wireless networks, and may be referred to as, for example, a "network device," a "network controller," a "network card," a "communication module" and so on. For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, etc.). The output apparatus 1006 is an output device for allowing sending output to the outside (for example, a display, a speaker, etc.). Note that the input apparatus 1005 and the output apparatus 1006 may be provided in an integrated structure (for example, a touch panel).

Also, the apparatuses, including the central processing apparatus 1001, the primary storage apparatus 1002 and so on, may be connected via a bus 1007 to communicate information with each other. The bus 1007 may be formed with a single bus, or may be formed with buses that vary between the apparatuses. Note that the hardware structure of the radio base station 10 and the user terminal 20 may be designed to include one or more of each apparatus shown in the drawings, or may be designed not to include part of the apparatuses.

For example, the radio base station 10 and the user terminal 20 may be structured to include hardware such as an ASIC (Application-Specific Integrated Circuit), a PLD (Programmable Logic Device), an FPGA (Field Programmable Gate Array) and so on, and part or all of the functional blocks may be implemented by the hardware.

Note that the terminology used in this description and the terminology that is needed to understand this description may be replaced by other terms that convey the same or similar meanings. For example, "channels" and/or "symbols" may be replaced by "signals" (or "signaling"). Also, "signals" may be "messages."

Furthermore, "component carriers" (CCs) may be referred to as "cells," "frequency carriers," "carrier frequencies" and so on.

Also, the information and parameters described in this description may be represented in absolute values or in relative values with respect to a predetermined value, or may be represented in other information formats. For example, radio resources may be specified by predetermined indices.

The information, signals and/or others described in this description may be represented by using a variety of different technologies. For example, data, instructions, commands, information, signals, bits, symbols and chips, all of which may be referenced throughout the description, may be represented by voltages, currents, electromagnetic waves, magnetic fields or particles, optical fields or photons, or any combination of these.

Also, software and commands may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation and microwaves), these wired technologies and/or wireless technologies are also included in the definition of communication media.

The example s/embodiments illustrated in this description may be used individually or in combinations, and the mode of may be switched depending on the implementation. Also, a report of predetermined information (for example, a report to the effect that "X holds") does not necessarily have to be sent explicitly, and can be sent implicitly (by, for example, not reporting this piece of information).

Reporting of information is by no means limited to the example s/embodiments described in this description, and other methods may be used as well. For example, reporting of information may be implemented by using physical layer signaling (for example, DCI (Downlink Control Information) and UCI (Uplink Control Information)), higher layer signaling (for example, RRC (Radio Resource Control) signaling, broadcast information (the MIB (Master Information Block) and SIBs (System Information Blocks)) and MAC (Medium Access Control) signaling and so on), other signals or combinations of these. Also, RRC signaling may be referred to as "RRC messages," and can be, for example, an RRC connection setup message, RRC connection reconfiguration message, and so on.

The examples/embodiments illustrated in this description may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and other adequate systems, and/or next-generation systems that are enhanced based on these.

The order of processes, sequences, flowcharts and so on that have been used to describe the examples/embodiments herein may be re-ordered as long as inconsistencies do not arise. For example, although various methods have been illustrated in this description with various components of steps in exemplary orders, the specific orders that illustrated herein are by no means limiting.

Now, although the present invention has been described in detail above, it should be obvious to a person skilled in the art that the present invention is by no means limited to the embodiments described herein. For example, the above-described embodiments may be used individually or in combinations. The present invention can be implemented with various corrections and in various modifications, without departing from the spirit and scope of the present invention defined by the recitations of claims. Consequently, the description herein is provided only for the purpose of explaining example s, and should by no means be construed to limit the present invention in any way.

The disclosures of Japanese Patent Application No. 2015-216044, filed on Nov. 2, 2015, and Japanese Patent Application No. 2015-217102, Nov. 4, 2015, including the specifications, drawings and abstracts, are incorporated herein by reference in their entirety.

The invention claimed is:

1. A user terminal, comprising:
 a receiver that receives downlink control information (DCI) in a given DCI format used for indication of system information modification; and
 a processor that controls reception of information related to the indication of system information modification based on a given flag transmitted by the DCI,
 wherein, when the given flag is a first value, the processor determines that information included in the DCI is the information related to the indication of system information modification, and when the given flag is a second value, the processor determines that the information included in the DCI is information related to allocation of paging information, wherein the scheduling information of a downlink shared channel that carries the information related to the allocation of the paging information is included in the DCI, and
 when the given flag is the second value, the processor controls the reception of the paging information based on the information related to the allocation of paging information included in the DCI, and a modulation coding scheme (MCS) included in the DCI.

2. The user terminal according to claim 1, wherein when the given flag is the second value, the information related to the allocation of the paging information is allocated to a downlink shared channel that is scheduled by the DCI.

3. The user terminal according to claim 2, wherein when the given flag is the first value, the DCI includes, in addition to the information related to the indication of system information modification, information to indicate at least one of Earthquake and Tsunami Warning System (ETWS), CMAS (Commercial Mobile Alert Service) and EAB (Extended Access Barring) and the DCI does not include allocation information of a downlink shared channel.

4. The user terminal according to claim 2, wherein at least one piece of the information related to the indication of system information modification is information that is configured in advance in system information.

5. The user terminal according to claim 1, wherein when the given flag is the first value, the DCI includes, in addition to the information related to the indication of system information modification, information to indicate at least one of Earthquake and Tsunami Warning System (ETWS), CMAS (Commercial Mobile Alert Service) and EAB (Extended Access Barring) and the DCI does not include allocation information of a downlink shared channel.

6. The user terminal according to claim 5, wherein at least one piece of the information related to the indication of system information modification is information that is configured in advance in system information.

7. The user terminal according to claim 1, wherein at least one piece of the information related to the indication of system information modification is information that is configured in advance in system information.

8. The user terminal according to claim 1, wherein, the user terminal is a user terminal of which a usage band is restricted to a narrow band that is a part of a system band.

9. A radio base station comprising:
   a transmitter that transmits downlink control information (DCI) in a given DCI format used for indication of system information modification to a user terminal; and
   a processor that controls an indication method of information related to indication of system information modification by using a given flag transmitted by the DCI,
   wherein, when the given flag is a first value, the processor determines that information included in the DCI is the information related to the indication of system information modification, and when the given flag is a second value, the processor determines that the information included in the DCI is information related to allocation of paging information, wherein the scheduling information of a downlink shared channel that carries the information related to the allocation of the paging information is included in the DCI, and
   when the given flag is a second value, the processor controls the reception of the paging information based on the information related to the allocation of paging information included in the DCI, and a modulation coding scheme (MCS) included in the DCI.

\* \* \* \* \*